(12) United States Patent
Oride et al.

(10) Patent No.: US 11,993,041 B2
(45) Date of Patent: May 28, 2024

(54) TIRE VULCANIZING BLADDER AND PNEUMATIC TIRE

(71) Applicant: BRIDGESTONE CORPORATION, Chuo-ku Tokyo (JP)

(72) Inventors: Junichi Oride, Tokyo (JP); Yasuhiro Oda, Tokyo (JP); Isao Matsumura, Tokyo (JP); Yuya Morita, Tokyo (JP)

(73) Assignee: BRIDGESTONE CORPORATION, Chuo-ku Tokyo (JP)

( * ) Notice: Subject to any disclaimer, the term of this patent is extended or adjusted under 35 U.S.C. 154(b) by 393 days.

(21) Appl. No.: 16/772,805

(22) PCT Filed: Jun. 14, 2018

(86) PCT No.: PCT/JP2018/022744
§ 371 (c)(1),
(2) Date: Jun. 15, 2020

(87) PCT Pub. No.: WO2019/123686
PCT Pub. Date: Jun. 27, 2019

(65) Prior Publication Data
US 2021/0162634 A1 Jun. 3, 2021

(30) Foreign Application Priority Data
Dec. 20, 2017 (JP) .................. 2017-244478

(51) Int. Cl.
*B29D 30/06* (2006.01)
*B60C 19/00* (2006.01)
(Continued)

(52) U.S. Cl.
CPC ........ *B29D 30/0654* (2013.01); *B60C 19/002* (2013.01); *B60C 19/12* (2013.01);
(Continued)

(58) Field of Classification Search
CPC ............ B60C 2013/026; B60C 19/002; B60C 19/003; B60C 19/12; B60C 19/125;
(Continued)

(56) References Cited

U.S. PATENT DOCUMENTS 8,079,839 B2 12/2011 Nemoto
2005/0161138 A1* 7/2005 Yukawa ................ B60C 11/033
152/381.6
(Continued)

FOREIGN PATENT DOCUMENTS

CN 2736146 Y 10/2005
CN 101903148 A 12/2010
(Continued)

OTHER PUBLICATIONS

Nagaie Y, JP-2002137227-A, machine translation. (Year: 2002).*
(Continued)

*Primary Examiner* — Sedef E Paquette
(74) *Attorney, Agent, or Firm* — KENJA IP LAW PC (57) ABSTRACT

Provided is a tire vulcanizing bladder comprising fluororubber, wherein a plurality of grooves extending in a width direction are formed on a circumference of an outer surface of the tire vulcanizing bladder, and a plurality of recesses connecting the grooves to each other are formed between the grooves. Also provided is a pneumatic tire comprising one or more fluorine-containing particles having a maximum diameter of 1.0 μm or more per area of 100 μm² of a tire inner surface, wherein a plurality of bladder ridges extending in a tire width direction are formed on a circumference of the tire inner surface, and a plurality of protrusions connecting the bladder ridges to each other are formed between the bladder ridges.

1 Claim, 4 Drawing Sheets (51) Int. Cl.
   *B60C 19/12* (2006.01)
   *B60C 13/00* (2006.01)

(52) U.S. Cl.
   CPC ............... *B29D 2030/0655* (2013.01); *B29D 2030/0659* (2013.01); *B60C 2013/026* (2013.01)

(58) Field of Classification Search
   CPC .......... B60C 2019/004; B29D 30/0654; B29D 2030/0655; B29D 2030/0659
   USPC ................................ 152/450; 156/110.1, 401
   See application file for complete search history.

(56) References Cited

U.S. PATENT DOCUMENTS

| | | | |
|---|---|---|---|
| 2011/0120612 A1 | | 5/2011 | Nemoto |
| 2012/0073725 A1* | | 3/2012 | Lo Presti ................. B60C 5/14 |
| | | | 152/450 |

FOREIGN PATENT DOCUMENTS

| | | | | | |
|---|---|---|---|---|---|
| CN | 102036809 | A | * | 4/2011 | ............ B29D 30/06 |
| CN | 102615750 | A | | 8/2012 | |
| JP | 2000317940 | A | * | 11/2000 | |
| JP | 2002137227 | A | | 5/2002 | |
| JP | 2002192528 | A | | 7/2002 | |
| JP | 2004026897 | A | | 1/2004 | |
| JP | 2005280259 | A | * | 10/2005 | |
| JP | 1052366 | B2 | | 2/2008 | |
| JP | 2009143169 | A | | 7/2009 | |
| JP | 2011201968 | A | | 10/2011 | |
| JP | 2011255597 | A | | 12/2011 | |
| JP | 2014184579 | A | | 10/2014 | |

OTHER PUBLICATIONS

Shibata, CN-102036809-A, machine translation. (Year: 2011).*
Higuchi T, JP-2000317940-A, machine translation. (Year: 2000).*
Ji Y J, JP-2005280259-A, machine translation. (Year: 2005).*
Higuchi T, JP-2000317940-A, updated machine translation. (Year: 2000).*
Chen X, CN-102615750-A, updated machine translation. (Year: 2012).*
Sep. 3, 2021, search result of Office Action issued by the China National Intellectual Property Administration in the corresponding Chinese Patent Application No. 201880081426.0.
Aug. 28, 2018, International Search Report issued in the International Patent Application No. PCT/JP2018/022744.
Jun. 23, 2020, International Preliminary Report on Patentability issued in the International Patent Application No. PCT/ JP2018/ 022744.
Jul. 28, 2021, search result of the Extended European Search Report issued by the European Patent Office in the corresponding European Patent Application No. 18891161.4.

* cited by examiner

CIRCUMFERENTIAL DIRECTION

WIDTH DIRECTION

TIRE VULCANIZING BLADDER AND PNEUMATIC TIRE

TECHNICAL FIELD

The present disclosure relates to a tire vulcanizing bladder and a pneumatic tire.

BACKGROUND

A manufacturing process of a pneumatic tire (hereinafter, also referred to simply as the tire) includes a vulcanization process of a raw tire (an unvulcanized tire). In this vulcanization process, a raw tire including a tire constituting member is usually placed in a tire vulcanizing mold, and a rubber-made bag referred to as a tire vulcanizing bladder (hereinafter, also referred to simply as the bladder) is further inserted in a lumen of the raw tire, the bladder comprising a tubular ring having a circular or horseshoe-shaped cross section. Next, a shaping gas is introduced into this bladder, and shaping is performed to bring an inner surface of the raw tire in contact closely with the bladder. Thereafter, a hot inert gas such as hot steam or hot nitrogen gas is introduced into the bladder. As a result, the raw tire is strongly pressed onto an inner surface of the vulcanizing mold, and is also heated from inside the raw tire. Furthermore, the vulcanizing mold is concurrently heated with the hot steam or the like, and hence the raw tire is also heated from an outer surface thereof, to vulcanize and mold the tire.

As this tire vulcanizing bladder, a bladder made of butyl rubber is generally used (e.g., see PTL 1). Here, the butyl rubber chemically reacts with a rubber of a raw tire inner surface member in contact with the bladder to come in contact closely with the rubber. Consequently, when the vulcanization process is performed using the bladder made of butyl rubber, the raw tire inner surface is painted with a release agent including silicon or talc.

However, a painting machine is used to paint the inner surface of the raw tire with the release agent, and hence, for example, there are problems that operation energy of the machine and a material such as painting liquid need to be consumed and that an operator is required.

To solve such problems, use of a tire vulcanizing bladder made of fluororubber has been also suggested. The fluororubber does not chemically react with the raw tire inner surface member, and hence it is not necessary to paint the inner surface of the raw tire with the release agent.

CITATION LIST

Patent Literature

PTL 1: Japanese Patent Laid-Open No. 2014-184579

SUMMARY

Technical Problem

Figure 7:
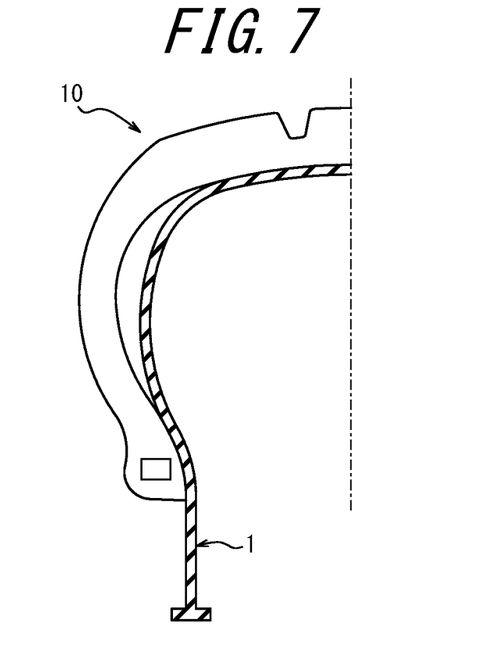
FIG. 7 is an explanatory view of followability of a tire vulcanizing bladder made of fluororubber to a raw tire before vulcanized.
Figure 8:
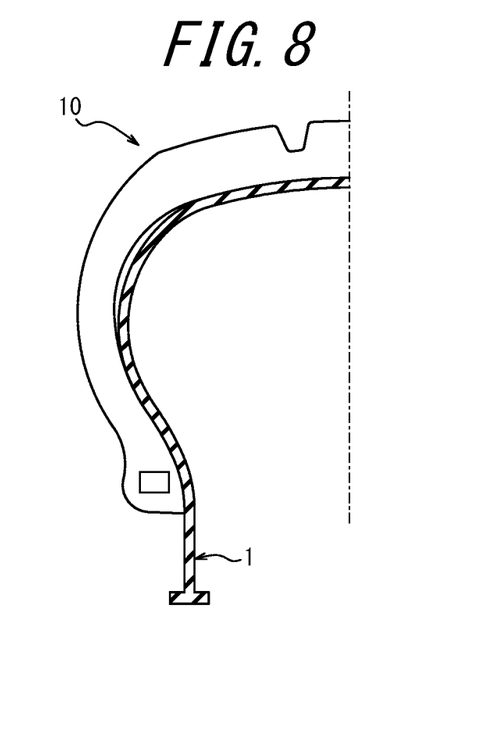
FIG. 8 is an explanatory view of followability of a tire vulcanizing bladder made of butyl rubber to a raw tire before vulcanized.

However, as illustrated in FIG. 7 in contrast with FIG. 8 illustrating a bladder of butyl rubber, it is found that fluororubber is hard in contrast with butyl rubber, and hence from a hump portion to a bead portion prior to vulcanization, a large volume of air remains between the bladder and a raw tire during shaping. Thus, it is found that the raw tire is not sufficiently in contact with the bladder, and hence bareness might be generated in a vulcanized tire inner surface.

To solve the problem, an object of the present disclosure is to provide a tire vulcanizing bladder that is capable of inhibiting generation of bareness in a vulcanized tire, and to decrease bareness in a pneumatic tire manufactured using the tire vulcanizing bladder.

Solution to Problem

A gist configuration of the present disclosure is as follows.
According to the present disclosure, provided is a tire vulcanizing bladder comprising fluororubber, wherein
a plurality of grooves extending in a width direction are formed on a circumference of an outer surface of the tire vulcanizing bladder, and
a plurality of recesses connecting the grooves to each other are formed between the grooves.

Here, "the groove" refers to a portion having a depth (a maximum depth) of 0.3 mm or more.

Furthermore, "the recess" refers to a portion having a depth (a maximum depth) from 0.1 to 0.25 mm.

According to the present disclosure, provided is a pneumatic tire comprising one or more fluorine-containing particles having a maximum diameter of 1.0 μm or more per area of 100 μm$^2$ of a tire inner surface, wherein
a plurality of bladder ridges extending in a tire width direction are formed on a circumference of the tire inner surface, and
a plurality of protrusions connecting the bladder ridges to each other are formed between the bladder ridges.

Here, "the bladder ridge" refers to a portion having a height (a maximum height) of 0.3 mm or more under atmospheric pressure.

Furthermore, "the protrusion" refers to a portion having a height (a maximum height) from 0.1 to 0.25 mm under atmospheric pressure.

In the present description, "a rim" indicates an approved rim (a Measuring Rim in STANDARDS MANUAL of ETRTO, and a Design Rim in YEAR BOOK of TRA) in an applicable size described or to be described in future in an industrial standard effective in a district where the tire is produced and used, for example, JATMA YEAR BOOK of JATMA (the Japan Automobile Tyre Manufacturers Association) in Japan, STANDARDS MANUAL of ETRTO (The European Tyre and Rim Technical Organisation) in Europe, YEAR BOOK of TRA (The Tire and Rim Association, Inc.) in U.S. or the like (that is, the above "rim" also includes a size that can be included in the above industrial standard in future, in addition to the existing size. Examples of "the size to be described in future" include sizes described as "FUTURE DEVELOPMENTS" in 2013 edition of STANDARDS MANUAL of ETRTO). However, in the case of a rim having a size that is not described in the above industrial standard, "a rim" refers to a rim having a width corresponding to a bead width of the tire. Additionally, "a prescribed internal pressure" indicates an air pressure (a maximum air pressure) corresponding to a tire maximum load capability in a tire of an applicable size in the above standard of JATMA or the like. Note that in the case of a size that is not described in the above industrial standard, "the prescribed internal pressure" refers to an air pressure (the maximum air pressure) corresponding to the maximum load capability prescribed for each vehicle to which the tire is mounted.

Advantageous Effect

According to the present disclosure, provided is a tire vulcanizing bladder that is capable of inhibiting generation of bareness in a vulcanized tire, and bareness in a pneumatic tire manufactured using the tire vulcanizing bladder can be decreased.

DETAILED DESCRIPTION

Hereinafter, embodiments of the present disclosure will be illustratively described in detail with reference to the drawings. Note that dimensions or the like in the present description correspond to those of a new product unless otherwise noted.

<Tire Vulcanizing Bladder>

Figure 1:
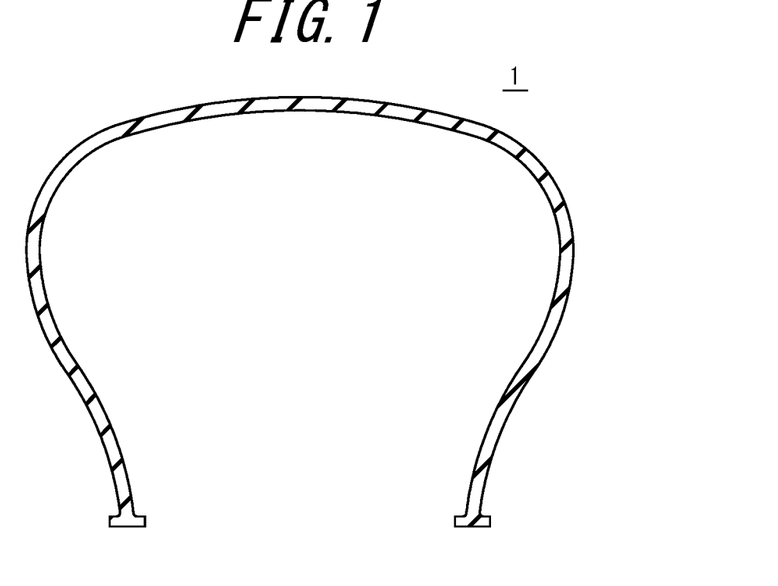
FIG. 1 is a width direction cross-sectional view illustrating a tire vulcanizing bladder according to an embodiment of the present disclosure.

FIG. 1 is a width direction cross-sectional view illustrating a tire vulcanizing bladder 1 according to an embodiment of the present disclosure. FIG. 1 illustrates a schematic cross-sectional shape of the tire vulcanizing bladder 1 in a state of being pressed onto an inner surface of an unvulcanized tire. As illustrated in FIG. 1, the tire vulcanizing bladder 1 (hereinafter, also referred to simply as the bladder) is a rubber-made bag comprising a tubular ring having a circular or horseshoe-shaped (in an illustrated example, horseshoe-shaped) cross section. The bladder 1 of the present embodiment is made of fluororubber (a rubber composition including fluororubber as a main component).

Figure 2:
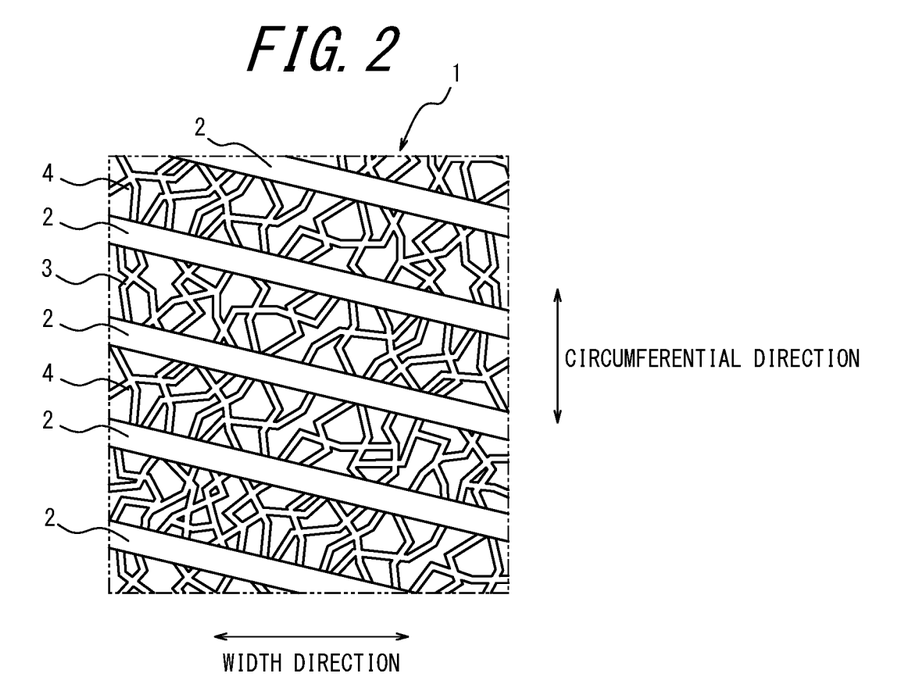
FIG. 2 is a developed view illustrating a part of an outer surface of the tire vulcanizing bladder according to the embodiment of the present disclosure.

FIG. 2 is a developed view illustrating a part of an outer surface of the tire vulcanizing bladder 1 according to the embodiment of the present disclosure. As illustrated in FIG. 2, a plurality of grooves 2 extending in a width direction are formed on a circumference of the outer surface of the bladder 1. Note that in this example, the grooves 2 are arranged via an equal space in a circumferential direction, but may be arranged via different intervals. Furthermore, in this example, the grooves 2 tilt and extend in the width direction, but may extend along the width direction. Additionally, in this example, the grooves 2 linearly extend in this developed view, but may be curved and extend. In addition, according to this example, the grooves 2 extend continuously, but may extend discontinuously.

Here, in the bladder 1 of the present embodiment that is pressed onto the inner surface of the unvulcanized tire, five or more grooves 2 per inch in the circumferential direction are formed at any position in the outer surface in the width direction. Furthermore, in the bladder 1 of the present embodiment, a plurality of recesses 3 connecting the grooves 2 to each other are formed between the grooves 2 (note that illustration is omitted in FIG. 3). In the present embodiment, the recesses 3 have a depth from 0.1 to 0.25 mm. As illustrated in the drawing, the recesses 3 have a random shape including a portion branched into three or more portions, and form a so-called pebble pattern. Note that illustration of the grooves 2 and the recesses 3 is omitted in FIG. 1.

Hereinafter, operations and effects of the tire vulcanizing bladder 1 of the present embodiment will be described.

In a tire vulcanization process, it is found that fluororubber is hard to stretch, and hence air may remain in a void between the bladder 1 and an inner surface of a raw tire.

According to the tire vulcanizing bladder 1 of the present embodiment, a plurality of recesses 3 connecting the grooves 2 to each other are formed between the grooves 2. Therefore, even in case where air remains as described above, air can escape through the plurality of recesses 3 to the grooves 2, and remaining air can be exhausted from the grooves 2. Consequently, remaining air can be suppressed, and generation of bareness in the vulcanized tire can be inhibited.

According to the tire vulcanizing bladder 1 of the present embodiment, the generation of the bareness in the vulcanized tire can be inhibited, and in the vulcanized tire, bareness decreases.

In the tire vulcanizing bladder 1 of the present disclosure that is pressed onto the inner surface of the unvulcanized tire as in the above embodiment, it is preferable that five or more grooves 2 per inch in the circumferential direction are formed at any position in the outer surface in the width direction. This is because stress per groove 2 during the vulcanization can be relaxed, and generation and development of cracks that may be generated due to the stress can be inhibited.

Furthermore, in the tire vulcanizing bladder 1 of the present disclosure, it is preferable that 20 or less grooves 2 per inch in the circumferential direction are formed at any position in the outer surface in the width direction. This is because failure in rubber flow in the vulcanization process can be suppressed.

Additionally, it is preferable that eight or more and 15 or less grooves 2 per inch in the circumferential direction are formed at any position in the outer surface in the width direction. This is because if the eight or more grooves 2 per inch in the circumferential direction are formed, concentration of the stress per groove 2 can be further relaxed, whereas if 15 or less grooves 2 per inch in the circumferential direction are formed, the failure in the rubber flow in the vulcanization process can be further suppressed. In the tire vulcanizing bladder 1 of the present disclosure, it is preferable that ten or more grooves 2 per inch in the circumferential direction are formed at any position in the outer surface in the width direction. This is because if ten or more grooves 2 per inch in the circumferential direction are formed, the concentration of the stress per groove 2 can be further relaxed.

Figure 3:
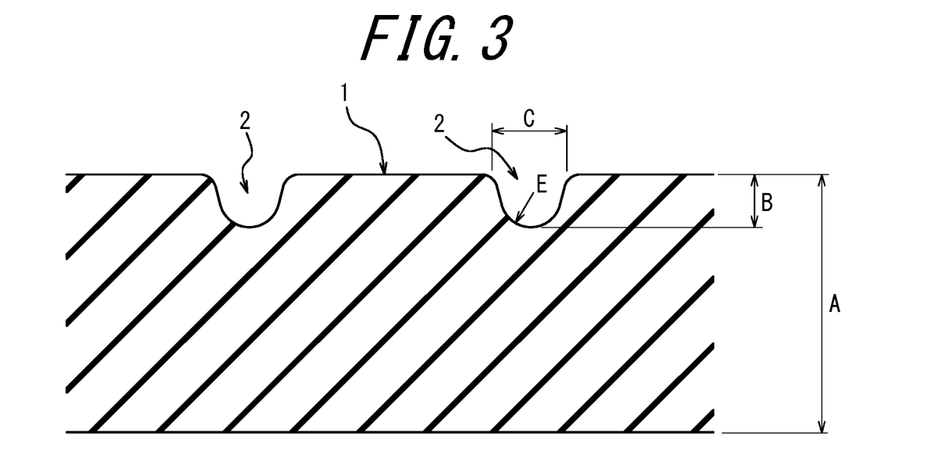
FIG. 3 is a cross-sectional view illustrating grooves.

FIG. 3 is a cross-sectional view illustrating the grooves 2.

In the present disclosure, it is preferable that a ratio B/A satisfies: $0.03 \leq B/A \leq 0.15$, in which A (mm) is a gauge of the tire vulcanizing bladder 1, and B (mm) is a depth of the groove 2.

This is because if the ratio B/A is set to 0.03 or more, quality of the tire inner surface can be further improved, whereas if the ratio B/A is set to 0.15 or less, rigidity to the stress generated in the grooves 2 can be ensured, and durability of the bladder 1 can be further improved.

Here, "the gauge" refers to a maximum gauge, and "the depth" refers to a maximum depth.

In the present disclosure, it is preferable that a ratio B/C satisfies: 0.3≤B/C≤1.0, in which C (mm) is a width of each of the grooves 2, and B (mm) is a depth of the groove 2.

This is because if the ratio B/C is 0.3 or more, the quality of the tire inner surface can be further improved, whereas if the ratio B/C is 1.0 or less, the rigidity to the stress generated in the grooves 2 can be ensured, and the durability of the bladder 1 can be further improved.

Here, "the width of the groove" refers to a distance in the width direction from a midpoint between two inflection points of one side wall of the groove in an extending direction to a midpoint between two inflection points of the other side wall in the extending direction.

In the present disclosure, it is preferable that a ratio B/D satisfies: 0.001≤B/D≤0.006, in which D (grooves) is a number of the grooves 2 on the whole circumference, and B (mm) is the depth of each of the grooves 2.

This is because if the ratio B/D is 0.001 or more, the quality of the tire inner surface can be further improved, whereas if the ratio B/D is 0.006 or less, the rigidity to the stress generated in the grooves 2 can be ensured, and the durability of the bladder 1 can be further improved.

In the present disclosure, it is preferable that a ratio B/E satisfies: 1.0≤B/E≤K 5.0, in which E (mm) is a radius of curvature of a corner of a bottom of each of the grooves 2 in a cross section of the groove 2 in an extending direction, and B (mm) is a depth of the groove 2.

This is because if the ratio B/E is 1.0 or more, the quality of the tire inner surface can be further improved, whereas if the ratio B/E is 5.0 or less, the rigidity to the stress generated in the grooves 2 can be ensured, and the durability of the bladder 1 can be further improved.

In the present disclosure, it is preferable that the depth B of the groove 2 is from 0.3 to 0.5 mm.

In the tire vulcanizing bladder of the present disclosure, it is preferable that the recesses 3 are provided only in a portion of the bladder 1 that abuts on an inner surface of the raw tire corresponding to a portion of a finished product of the tire from a hump portion to a bead portion (from an outermost edge of the hump portion in a tire radial direction to an innermost edge of the bead portion in the tire radial direction). In a region where the above described stress is most likely to concentrate, the stress can be further relaxed, and the failure in the rubber flow can be suppressed. Furthermore, this region is also a region where air is likely to remain, and the remaining air can be effectively exhausted from the grooves 2 through the recesses 3. On the other hand, a tire inner surface member such as a sound control body of a sponge material or the like or a puncture prevention member of sealant or the like can be easily attached to a center portion of the tire. This is because if protrusions are formed in (the recesses 3 are transferred to) the center portion, a contact area between the tire inner surface member and the tire inner surface decreases to lower adhesiveness.

In the tire vulcanizing bladder of the present disclosure, it is preferable that the recesses 3 are provided at a position or in a vicinity of the position on the circumference of the outer surface of the bladder 1 that abuts on at least a joining portion (a portion where the carcass plies overlap) on a circumference of the carcass ply of the raw tire. This is because at the position on the circumference, air is most likely to remain, air can be therefore efficiently inhibited from remaining, and the generation of the bareness in the vulcanized tire can be inhibited. For example, the recesses 3 may be provided over the whole circumference of the outer surface of the bladder 1.

The recesses 3 themselves are arranged in a random shape as described above, and hence small land portions 4 which are defined by the recesses 3 may have a random shape as described above. On the other hand, it is preferable that on the whole circumference of the outer surface of the bladder 1, a number density of the above small land portions 4 is set to be almost constant on the circumference. Alternatively, it is preferable that at the position or in the vicinity of the position on the circumference of the outer surface of the bladder 1 that abuts on at least the joining portion (the portion where the carcass plies overlap) on the circumference of the carcass ply of the raw tire, the number density of the small land portions 4 is set to be larger than that of another region on the circumference.

<Pneumatic Tire>

Figure 4:
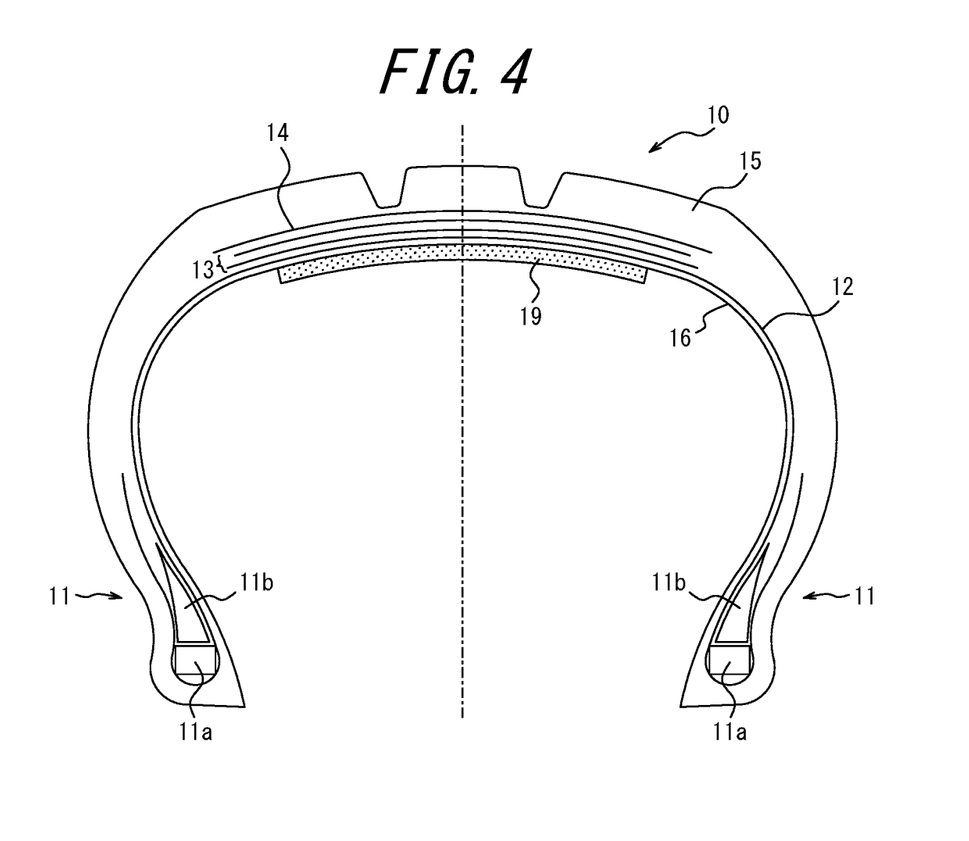
FIG. 4 is a tire width direction cross-sectional view illustrating a pneumatic tire according to an embodiment of the present disclosure.

FIG. 4 is a tire width direction cross-sectional view illustrating a pneumatic tire 10 according to an embodiment of the present disclosure. As illustrated in FIG. 4, the tire 10 includes a belt 13 comprising one or more (in an illustrated example, two) belt layers, a belt protective layer 14 comprising one or more layers (in the illustrated example, one layer), and a tread 15 in this order, on an outer side of a carcass 12 that toroidally straddles bead cores 11a embedded in a pair of bead portions 11 in a tire radial direction. Furthermore, bead fillers 11b having a triangular cross-sectional shape are arranged on outer sides of the bead cores 11a in the tire radial direction. There are not any special restrictions on the tire of the present disclosure, except for a structure of a tire inner surface 16. For example, the tire does not have to include the bead fillers 11b or the belt protective layer 14. Furthermore, there are not any special restrictions on a number of carcass plies, a number of layers in each of the belt layer and the belt protective layer, a material or the like of a cord, a carcass structure or a belt structure.

The pneumatic tire of the present embodiment is manufactured through a vulcanization process in which the tire vulcanizing bladder of the above embodiment is used. Therefore, the tire of the present embodiment includes one or more fluorine-containing particles having a maximum diameter of 1.0 μm or more per area of 100 μm² of the tire inner surface 16.

Figure 5:
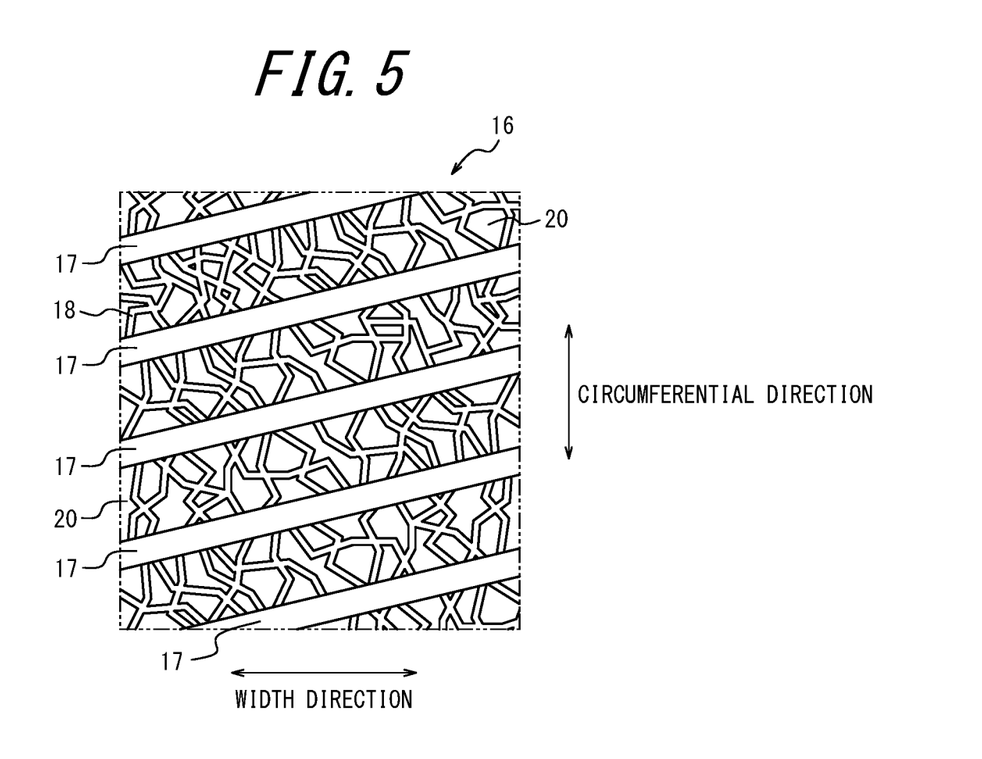
FIG. 5 is a developed view illustrating a part of a tire inner surface of the pneumatic tire according to the embodiment of the present disclosure.

FIG. 5 is a developed view illustrating a part of the tire inner surface 16 of the pneumatic tire according to the embodiment of the present disclosure. As illustrated in FIG. 5, in the tire of the present embodiment, a plurality of bladder ridges 17 extending in a tire width direction are formed on a circumference of the tire inner surface 16. Note that in this example, the grooves 2 are arranged via an equal space in a tire circumferential direction, but may be arranged via different intervals. Furthermore, in this example, the bladder ridges 17 tilt and extend in the tire width direction, but may extend along the tire width direction. Additionally, in this example, the bladder ridges 17 linearly extend in this developed view, but may be curved and extend. In addition, according to this example, the bladder ridges 17 extend continuously, but may extend discontinuously.

Five or more bladder ridges 17 per inch in the tire circumferential direction are formed at any position in the tire inner surface 16 in the tire width direction. Furthermore, as illustrated in FIG. 5, a plurality of protrusions 18 connecting the bladder ridges 17 to each other are formed between the bladder ridges 17 (note that illustration is omitted in FIG. 6). The protrusions 18 are formed only in the inner surface from a hump portion to a bead portion (from an outermost edge of the hump portion in the tire radial direction to an innermost edge of the bead portion in the tire radial direction), and the protrusions are not formed in an inner surface of a center portion that is an intermediate region. In the present embodiment, the protrusions 18 have a height from 0.1 to 0.25 mm under atmospheric pressure. As illustrated in the drawing, the protrusions 18 have a random shape including a portion branched into three or more portions, and form a so-called pebble pattern. Furthermore, five or more bladder ridges 17 per inch in the tire circumferential direction are formed particularly at any position in the inner surface of each of the bead portions 11 in the tire width direction. Note that illustration of the bladder ridges 17 and the protrusions 18 is omitted from FIG. 4.

Furthermore, in the tire 10, a tire inner surface member 19 (in the present embodiment, a sound control body comprising a sponge material) is disposed in a tire width direction region of at least a part of the center portion that is a tire width direction region between the hump portions (in the present embodiment, a center region of 80% of a peripheral length of the tire inner surface of the center portion). Therefore, in a region of each end of 10% of the peripheral length of the tire inner surface of the center portion, the protrusions 18 described above are not formed and the tire inner surface member 19 is not disposed.

Hereinafter, operations and effects of the pneumatic tire of the present embodiment will be described.

In a tire vulcanization process, it is found that fluororubber is hard to stretch, and hence air may remain in a void between the bladder 1 and an inner surface of a raw tire.

Here, the bladder ridges 17 of the tire 10 are formed by transferring the grooves 2 of the bladder 1, and the protrusions 18 of the tire 10 are formed by transferring the recesses 3 of the bladder 1.

According to the pneumatic tire 10 of the present embodiment, a plurality of protrusions 18 connecting the bladder ridges 17 to each other are formed between the bladder ridges 17. Therefore, even in case where air remains as described above, the air can escape through the plurality of recesses 3 to the grooves 2, and the remaining air can be exhausted from the grooves 2. Consequently, the remaining air is suppressed, and bareness of the tire is decreased.

According to the pneumatic tire 10 of the present embodiment, the bareness can be decreased.

Here, in the pneumatic tire 10 of the present disclosure, it is preferable that five or more bladder ridges 17 per inch in the tire circumferential direction are formed at any position of the tire inner surface 16 in the tire width direction as in the above embodiment. This is because stress per groove 2 of the bladder 1 used in the vulcanization during the vulcanization can be relaxed, generation and development of cracks that may be generated due to the stress can be inhibited, and the tire inner surface 16 of the pneumatic tire 10 can have excellent quality.

Here, in the pneumatic tire 10 of the present disclosure, it is preferable that 20 or less bladder ridges 17 per inch in the tire circumferential direction are formed at any position of the tire inner surface 16 in the tire width direction. This is because failure in rubber flow in the vulcanization process is suppressed, and the tire has high quality.

Furthermore, in the pneumatic tire 10 of the present disclosure, it is preferable that eight or more and 15 or less bladder ridges 17 per inch in the tire circumferential direction are formed at any position of the tire inner surface 16 in the tire width direction. This is because if eight or more bladder ridges 17 per inch in the circumferential direction are formed, the tire inner surface 16 can have more excellent quality, whereas if 15 or less bladder ridges 17 per inch in the circumferential direction are formed, the failure in the rubber flow in the vulcanization process can be further suppressed. In the pneumatic tire 10 of the present disclosure, it is preferable that ten or more bladder ridges 17 per inch in the circumferential direction are formed. This is because if ten or more bladder ridges 17 per inch in the circumferential direction are formed, the tire inner surface 16 can have further excellent quality.

In the present disclosure, it is preferable that five or more bladder ridges 17 per inch on the circumference in the tire circumferential direction are formed in the inner surface of the bead portion 11. This is because the tire inner surface 16 can have further excellent quality.

Figure 6:
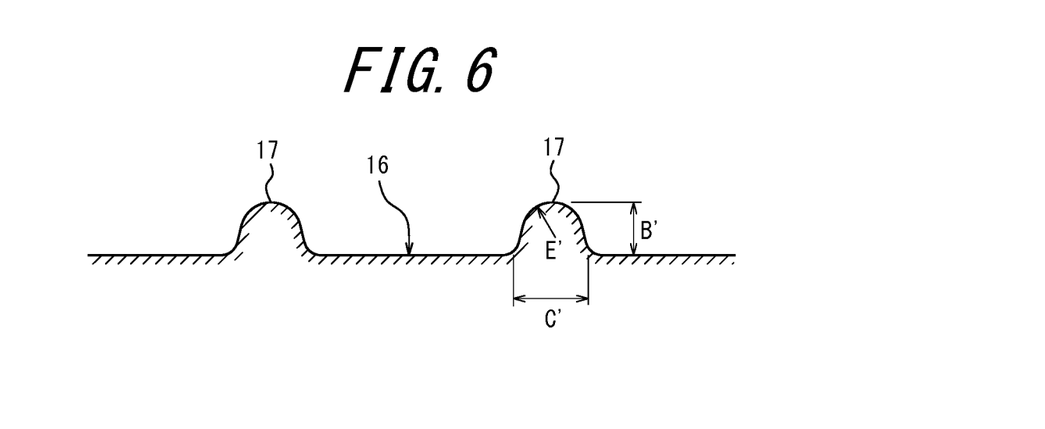
FIG. 6 is a cross-sectional view illustrating bladder ridges.

FIG. 6 is a cross-sectional view illustrating the bladder ridges 17.

In the present disclosure, it is preferable that a ratio B'/C' satisfies: $0.3 \leq B'/C' \leq 1.0$, in which C' (mm) is a width of each of the bladder ridges 17, and B' (mm) is a height of the bladder ridge 17.

This is because if the ratio B'/C' is 0.3 or more, the quality of the tire inner surface can be further improved, whereas if the ratio B'/C' is 1.0 or less, the quality of the tire inner surface 16 can be further improved.

Here, "the width of the bladder ridge" refers to a distance in the width direction from a midpoint between two inflection points of one side wall of the bladder ridge under atmospheric pressure in an extending direction to a midpoint between two inflection points of the other side wall in the extending direction, and "the height" refers to a maximum height under the atmospheric pressure.

In the present disclosure, it is preferable that a ratio B'/D' satisfies: $0.001 \leq B'/D' \leq 0.006$, in which D' (ridges) is a number of the bladder ridges 17 on the whole circumference, and B' (mm) is the height of each of the bladder ridges 17.

This is because if the ratio B'/D' is 0.001 or more, the quality of the tire inner surface can be further improved, whereas if the ratio B'/D' is 0.006 or less, the quality of the tire inner surface 16 can be further improved.

In the present disclosure, it is preferable that a ratio B'/E' satisfies: $1.0 \leq B'/E' \leq 5.0$, in which E' (mm) is a radius of curvature of a corner of an apex of each of the bladder ridges 17 in a cross section of the bladder ridge 17 in an extending direction, and B' (mm) is a height of the bladder ridge 17.

This is because if the ratio B'/E' is 1.0 or more, the quality of the tire inner surface can be further improved, whereas if the ratio B'/E' is 5.0 or less, the quality of the tire inner surface 16 can be further improved.

In the present disclosure, it is preferable that the height B' of the bladder ridge 17 is from 0.3 to 0.5 mm, for example, in a tire for a passenger vehicle.

In the present disclosure, it is preferable that a plurality of protrusions 18 connecting the bladder ridges 17 to each other are formed between the bladder ridges 17, and the protrusions 18 are formed only in the inner surface from the hump portion to the bead portion (from the outermost edge of the hump portion in the tire radial direction to the innermost edge of the bead portion in the tire radial direction).

In portions corresponding to the hump portion and the bead portion where the above described stress is most likely to concentrate, the stress can be further relaxed. Furthermore, the failure in the rubber flow can be suppressed, and the tire can have excellent quality. Additionally, these portions are also a region where air is likely to remain, and the remaining air can be effectively exhausted from the grooves 2 through the recesses 3. On the other hand, a tire inner surface member such as a sound control body of a sponge material or the like or a puncture prevention member of sealant or the like can be easily attached to a center portion of the tire 10. This is because if the protrusions 18 are formed in the center portion, a contact area between the tire inner surface member 19 and the tire inner surface 16 decreases to lower adhesiveness.

Note that the present disclosure is not necessarily limited to a case where the protrusions 18 are formed only at the above position, and the protrusions may be included, for example, in the center portion or the whole tire inner surface 16.

In the pneumatic tire of the present disclosure, it is preferable that the protrusions 18 are provided at a position and a vicinity of the position of at least a joining portion on a circumference of a carcass ply on a circumference of the tire inner surface 16. This is because bareness can be effectively decreased in the same manner as described above. For example, the protrusions 18 may be provided over the whole circumference of the tire inner surface 16.

The protrusions 18 themselves are arranged in a random shape, and hence small recesses 20 which are defined by the protrusions 18 have a random shape as described above. On the other hand, it is preferable that on the whole circumference of the tire inner surface 16, a number density of the above small recesses 20 is set to be almost constant on the circumference. Alternatively, it is preferable that at the position and in the vicinity of the position of at least the joining portion on the circumference of the carcass ply on the circumference of the tire inner surface 16, the number density of the small recesses 20 is set to be larger than that of another region on the circumference.

In the present disclosure, the tire inner surface member 19 may be disposed at any position of the tire inner surface 16 in the tire width direction. For example, in case where the tire inner surface member 19 is disposed on an inner surface of a center portion, the tire inner surface member 19 may be disposed in a part of the center portion or an entire region thereof.

Furthermore, in the present disclosure, the tire inner surface member 19 may be disposed in a region of at least a part of the circumference of the tire inner surface 16. It is preferable that the tire inner surface member 19 is disposed on the whole circumference of the tire inner surface 16.

In the present embodiment, the tire inner surface member 19 is the sound control body comprising the sponge material. The sponge material is a sponge-like porous structure, and comprises so-called sponge including continuous bubbles of, for example, foamed rubber or synthetic resin. Furthermore, the sponge material includes a web-like material in which animal fibers, plant fibers, synthetic fibers or the like are intertwined and integrally coupled, in addition to the above described sponge. Note that the above described "porous structure" means that the structure comprises not only a structure including continuous bubbles but also a structure including independent bubbles. In such a sponge material as described above, voids formed in a surface and an interior convert vibration energy of vibrating air into heat energy. This can suppress cavity resonance in a tire lumen, and can eventually reduce road noise. Furthermore, the sponge material can be easily contracted, bent or deformed otherwise. Therefore, if the sound control body formed of the sponge material is fixed to the tire inner surface 16, deformation of the tire 10 during travel is not substantially affected. That is, this configuration to fix the sound control body to the tire inner surface 16 is hard to adversely affect steering stability or the like. Examples of a material of the sponge material include synthetic resin sponges such as ether polyurethane sponge, ester polyurethane sponge, polyethylene sponge, and rubber sponges such as chloroprene rubber sponge (CR sponge), ethylene propylene rubber sponge (EPDM sponge), and nitrile rubber sponge (NBR sponge). In consideration of viewpoints of sound controllability, lightness, adjustability of foaming, durability and the like, it is preferable to use sponge such as polyurethane or polyethylene sponge including ether polyurethane sponge. Note that there are not any special restrictions on a material constituting the sound control body as long as it can control cavity resonance energy to be reduced by relaxation or absorption of the cavity resonance energy, conversion to another type of energy (e.g., heat energy) or the like. The above described sponge material is not limited, and for example, urethane or nonwoven fabric may be used. Furthermore, specific gravity of the sponge material is preferably from 0.005 to 0.06, more preferably from 0.01 to 0.04, and especially preferably from 0.01 to 0.03 in consideration of balance between increase in a tire weight and an effect of suppressing the cavity resonance. Furthermore, it is preferable that a volume of the sound control body is from 0.4% to 20% of a total volume of the tire lumen. If a volume of the sound control body that is as much as 0.4% or more of the total volume of the tire lumen is ensured, an effect of reducing the cavity resonance energy as much as a desired amount (e.g., 2 dB or more) is easily achieved. The volume of the sound control body is more preferably 1% or more, further preferably 2% or more, and especially preferably 4% or more of the total volume of the tire lumen. On the other hand, even if the volume of the sound control body is in excess of 20% of the total volume of the tire lumen, improvement of the effect of reducing the cavity resonance energy cannot be expected. There is rather concern that balance in weight of an assembly is worsened. From such a viewpoint, the volume of the sound control body is more preferably 16% or less, and especially preferably 10% or less of the total volume of the tire lumen. Note that the above described volume ratio is not related to a number of sound control bodies. That is, in case where there are plurality of sound control bodies, if a sum of all volumes of the plurality of sound control bodies satisfies the above described relation of the volume ratio, similar effects can be obtained.

Furthermore, in the present embodiment, the tire inner surface member 19 is the sound control body, but may be any other member such as a puncture prevention member of sealant or the like. In case of using the sealant, an arbitrary known material may be used.

For example, in case where the tire inner surface member 19 is the sound control body, low-noise performance of the tire can improve, and in case where the sound control body comprises the sponge material, the low-noise performance of the tire can effectively improve. Furthermore, for example, in case where the tire inner surface member 19 is the puncture prevention member, puncture of the tire can be prevented, and in case where the puncture prevention member comprises the sealant, the puncture of the tire can be effectively prevented.

As above, the embodiments of the present disclosure have been described, but the present disclosure is not limited to the above embodiments. Especially, for example, in the case where the recess 3 is configured to connect the grooves 2 to each other or the protrusion 18 is configured to connect the bladder ridges 17 to each other, an arbitrary pebble pattern can be formed, and there are not any special restrictions on a shape, width, number or the like of the recesses or the protrusions. Furthermore, for example, in the above embodiments, the recesses 3 or the protrusions 18 have a random shape or arrangement, but some or all of such portions may have a regular shape or arrangement. Additionally, the recesses 3 or the protrusions 18 can communicate with one another, and there are not any special restrictions on a number of communications (branches).

Hereinafter, examples of the present disclosure will be described, but the present disclosure is not limited to the following examples.

Examples

To check the effect of the present disclosure, tire vulcanizing bladders made of fluororubber according to Example 1 and a comparative example were experimentally produced. Table 1 illustrates specifications of the respective bladders and specifications of tires manufactured using the bladders.

As to Example 1 and the comparative example, a test to evaluate generation of bareness of each tire was performed.

<Generation Ratio of Bareness>

As to each manufactured tire, bareness of a tire inner surface was visually observed, and tires where the bareness was generated were counted. Note that "the bareness" refers to a defect that dent remains in the surface due to rubber flow defect.

TABLE 1

|  | Example 1 | Example 2 | Comparative Example |
|---|---|---|---|
| Recess (protrusion) (pebble pattern) | Bead portion to hump portion | Bead portion to center portion | None |
| Generation ratio of bareness | 0.2% | 0.2% | 10% |

As illustrated in Table 1, it is seen that Example 1 has less bareness than the comparative example.

REFERENCE SIGNS LIST 1 tire vulcanizing bladder
2 groove
3 recess
4 small land portion
10 pneumatic tire
11 bead portion
11a bead core
11b bead filler
12 carcass
13 belt
14 belt protective layer
15 tread
16 tire inner surface
17 bladder ridge
18 protrusion
19 tire inner surface member
20 small recess

The invention claimed is:

1. A pneumatic tire comprising one or more fluorine-containing particles having a maximum diameter of 1.0 μm or more per area of 100 μm² of a tire inner surface, wherein
a plurality of bladder ridges extending in a tire width direction are formed on a circumference of the tire inner surface,
a plurality of protrusions connecting the bladder ridges to each other are formed between the bladder ridges,
each of the bladder ridges has a height B' of from 0.3 to 0.5 mm,
each of the bladder ridges does not intersect with any other bladder ridges,
the height B' of each of the bladder ridges is higher than the height of each of the protrusions,
a ratio B'/D' satisfies:
$0.001 \leq B'/D' \leq 0.003$ or $0.005 \leq B'/D' \leq 0.006$, in which D' (ridges) is a number of the bladder ridges on the whole circumference,
a ratio B'/E' satisfies:
$1.0 \leq B'/E' \leq 5.0$, in which E' (mm) is a radius of curvature of a corner of an apex of each of the bladder ridges in a cross section of the bladder ridge in an extending direction,
eight or more and fifteen or less of the bladder ridges are formed per inch along the tire circumferential direction at any position of the tire inner surface in the tire width direction,
the pneumatic tire further comprises a tire inner surface member on the inner surface in a center portion, the center portion being a portion between hump portions in the tire width direction,
the tire inner surface member is disposed in a center region of 80% of a peripheral length in the tire width direction of the tire inner surface of the center portion,
the tire inner surface of the center portion is free of protrusions, and
a number density of small recesses which are defined by the protrusions at a position and in a vicinity of the position of at least a joining portion on a circumference of a carcass ply is greater than that of another position on the circumference of the tire inner surface.

* * * * *